United States Patent
Hisada et al.

(10) Patent No.: US 10,133,296 B2
(45) Date of Patent: Nov. 20, 2018

(54) MULTIDIRECTIONAL OPERATING DEVICE

(71) Applicant: KABUSHIKI KAISHA TOKAI RIKA DENKI SEISAKUSHO, Aichi (JP)

(72) Inventors: Masahito Hisada, Aichi (JP); Yusuke Kumakiri, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/706,834

(22) Filed: Sep. 18, 2017

(65) Prior Publication Data

US 2018/0081387 A1 Mar. 22, 2018

(30) Foreign Application Priority Data

Sep. 20, 2016 (JP) .................. 2016-182756

(51) Int. Cl.
*B60R 1/00* (2006.01)
*G05G 9/047* (2006.01)
(Continued)

(52) U.S. Cl.
CPC ......... *G05G 9/04792* (2013.01); *B60R 1/062* (2013.01); *H01H 25/04* (2013.01);
(Continued)

(58) Field of Classification Search
CPC .... B60R 1/07; B60R 1/062; H01H 2025/043; H01H 25/04; H01H 2300/012; H01H 3/20; H01H 25/041; H01H 2025/045; H01H 2025/046; H01H 25/06; H01H 25/065; G05G 9/047; G05G 9/04737; G05G 23/02; G05G 2009/04766; G05G 2009/0477; G05G 2009/04777; G05G 2009/04781; G05G 9/04792

See application file for complete search history.

(56) References Cited

U.S. PATENT DOCUMENTS

| 5,804,781 A * | 9/1998 | Okabe | G05G 9/047 |
| | | | 200/6 A |
| 6,812,415 B1 * | 11/2004 | Priesemuth | B60R 1/07 |
| | | | 200/5 R |

(Continued)

FOREIGN PATENT DOCUMENTS

| CN | 101471197 A | 7/2009 |
| CN | 101475621 A | 7/2009 |

(Continued)

OTHER PUBLICATIONS

Extended European Search Report issued in the corresponding EP Application No. 17191420.3 dated Feb. 26, 2018.

(Continued)

*Primary Examiner* — Jeremy R Severson
(74) *Attorney, Agent, or Firm* — Roberts Mlotkowski Safran Cole & Calederon, P.C.

(57) ABSTRACT

A multidirectional operating device includes an operational knob including a knob body and plural ribs, and a bezel portion disposed around a rotational axis of the operational knob. The bezel portion includes plural limiting portions formed standing from a top surface side so as to limit the inclination operation of the operational knob by being opposite to a contact surface of the ribs when the operational knob is located at a neutral position, and plural permitting portions arranged between the limiting portions so as to permit the inclination operation of the operational knob while avoiding a contact with the contact surface of the ribs when the operational knob is located at an operational position that allows the inclination operation by being rotated from the neutral position to a right or left position.

7 Claims, 7 Drawing Sheets

(51) Int. Cl.
*B60R 1/062* (2006.01)
*H01H 25/04* (2006.01)

(52) U.S. Cl.
CPC ... *H01H 2025/043* (2013.01); *H01H 2221/01* (2013.01); *H01H 2300/012* (2013.01); *H01H 2300/066* (2013.01)

(56) References Cited

U.S. PATENT DOCUMENTS

| | | | | |
|---|---|---|---|---|
| 8,035,043 B2 * | 10/2011 | Asada | .................... | H01H 25/06 |
| | | | | 200/6 A |
| 8,901,443 B2 * | 12/2014 | Baker | .................. | G06F 3/0362 |
| | | | | 200/17 R |
| 9,959,998 B2 * | 5/2018 | Hisada | ..................... | H01H 9/04 |
| 2009/0166166 A1 | 7/2009 | Onodera | | |
| 2015/0255234 A1 | 9/2015 | Matsumoto | | |

FOREIGN PATENT DOCUMENTS

| | | | | | |
|---|---|---|---|---|---|
| DE | 3524429 A1 | | 1/1987 | | |
| DE | 102014014021 A1 | * | 3/2016 | .............. | G05G 1/04 |
| JP | 2009-158389 A | | 7/2009 | | |

OTHER PUBLICATIONS

Chinese Office Action issued in corresponding Chinese Application No. 201710795098.8 dated Sep. 4, 2018.

\* cited by examiner

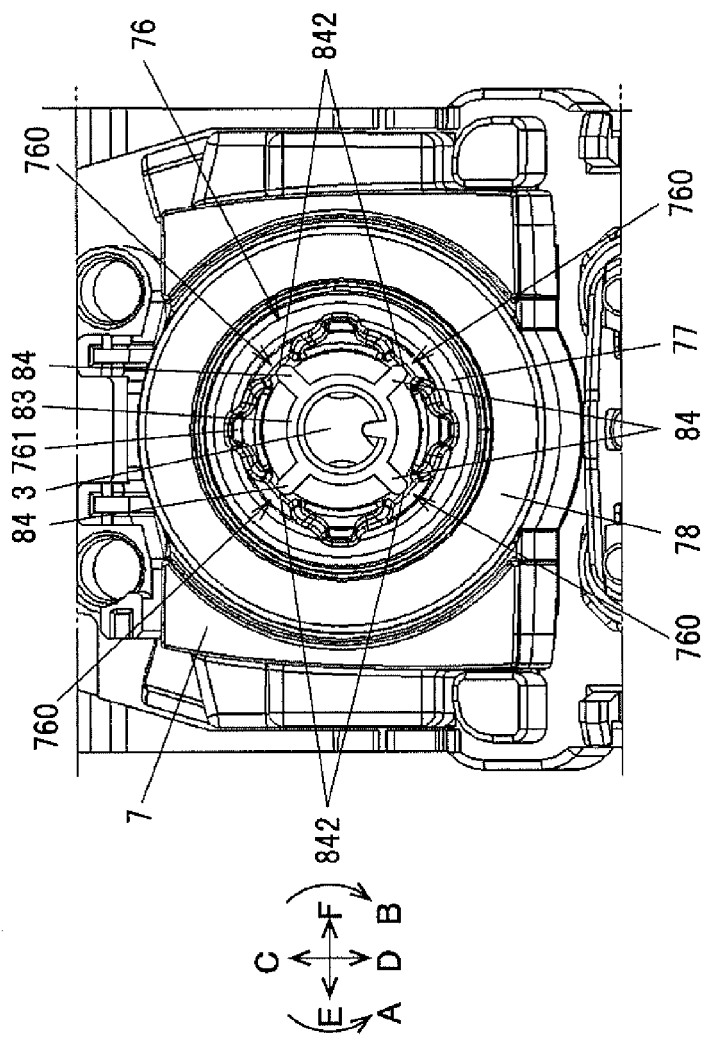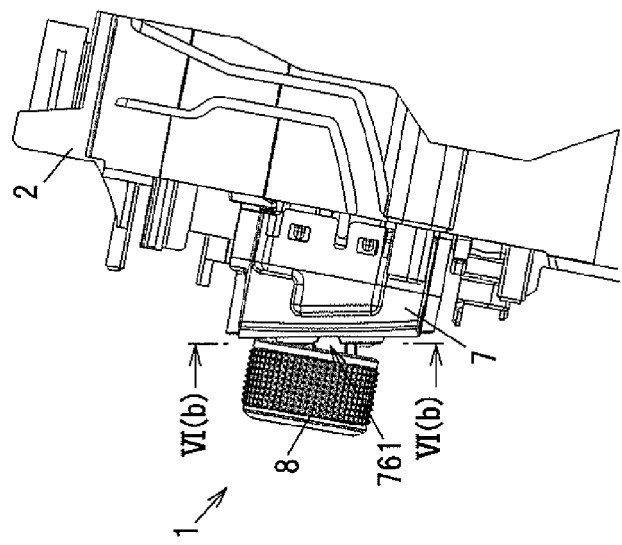

MULTIDIRECTIONAL OPERATING DEVICE

BACKGROUND OF THE INVENTION

1. Field of the Invention

This invention relates to a multidirectional operating device.

2. Description of the Related Art

A switch device is known which is provided with two engagement projection portions at two locations to be arranged by intervals of 90° in a rotational circumferential direction arranged at a spherical portion on a shaft side, and a guide portion including two limiting faces for being contacted with the two engagement projection portions at a neutral position of an operational knob to lock a swing motion of a shaft and three release recessed portions for releasing the contact with the two engagement projection portions at a switch operational position where the operational knob is rotated, to permit an operation of inclination motion by the operational knob in a plane direction thereof by the swing motion of the shaft arranged at an axis support tubular portion on a switch case side (see e.g. JP-A-2009-158389).

SUMMARY OF THE INVENTION

Although the switch device of JP-A-2009-158389 can prevent at the neutral position the occurrence of the backlash of the operational knob in a direction where the two engagement projection portions are evenly in contact with the limiting surfaces of the axis support tubular portion, the switch device may cause the backlash of the operational knob in the other directions.

It is an object of the invention to provide a multidirectional operating device that can prevent the backlash of the operational knob at the neutral position.

According to an embodiment of the invention, a multidirectional operating device comprises:

an operational knob comprising a knob body that is adapted to a rotation operation and an inclination operation, a cylindrical portion that protrudes from a bottom side of the knob body, and a plurality of ribs that protrude from a side surface of the cylindrical portion in a radial direction; and a bezel portion disposed around a rotational axis of the operational knob, wherein the bezel portion comprises:

a plurality of limiting portions formed standing from a top surface side so as to limit the inclination operation of the operational knob by being opposite to a contact surface of the ribs when the operational knob is located at a neutral position; and a plurality of permitting portions arranged between the plurality of limiting portions so as to permit the inclination operation of the operational knob while avoiding a contact with the contact surface of the ribs when the operational knob is located at an operational position that allows the inclination operation by being rotated from the neutral position to a right or left position.

Effects of the Invention

According to an embodiment of the invention, a multidirectional operating device can be provided that can prevent the backlash of the operational knob in the neutral position.

BRIEF DESCRIPTION OF THE DRAWINGS

Next, the present invention will be explained in conjunction with appended drawings, wherein:

FIG. 6A is a side view showing an example of the mirror controller according to the embodiment;

FIG. 6B is a cross sectional view showing the operational knob 8 in the neutral position cut along a line VI(b)-VI(b) in FIG. 6A and viewed from the arrow direction;

DETAILED DESCRIPTION OF THE PREFERRED EMBODIMENTS (Abstract of the Embodiment)

According to an embodiment of the invention, a multidirectional operating device comprises:

an operational knob comprising a knob body that is adapted to a rotation operation and an inclination operation, a cylindrical portion that protrudes from a bottom side of the knob body, and a plurality of ribs that protrude from a side surface of the cylindrical portion in a radial direction; and a bezel portion disposed around a rotational axis of the operational knob, wherein the bezel portion comprises:

a plurality of limiting portions formed standing from a top surface side so as to limit the inclination operation of the operational knob by being opposite to a contact surface of the ribs when the operational knob is located at a neutral position; and a plurality of permitting portions arranged between the plurality of limiting portions so as to permit the inclination operation of the operational knob while avoiding a contact with the contact surface of the ribs when the operational knob is located at an operational position that allows the inclination operation by being rotated from the neutral position to a right or left position.

Embodiments (Outline of Mirror Controller 1)

Figure 1:
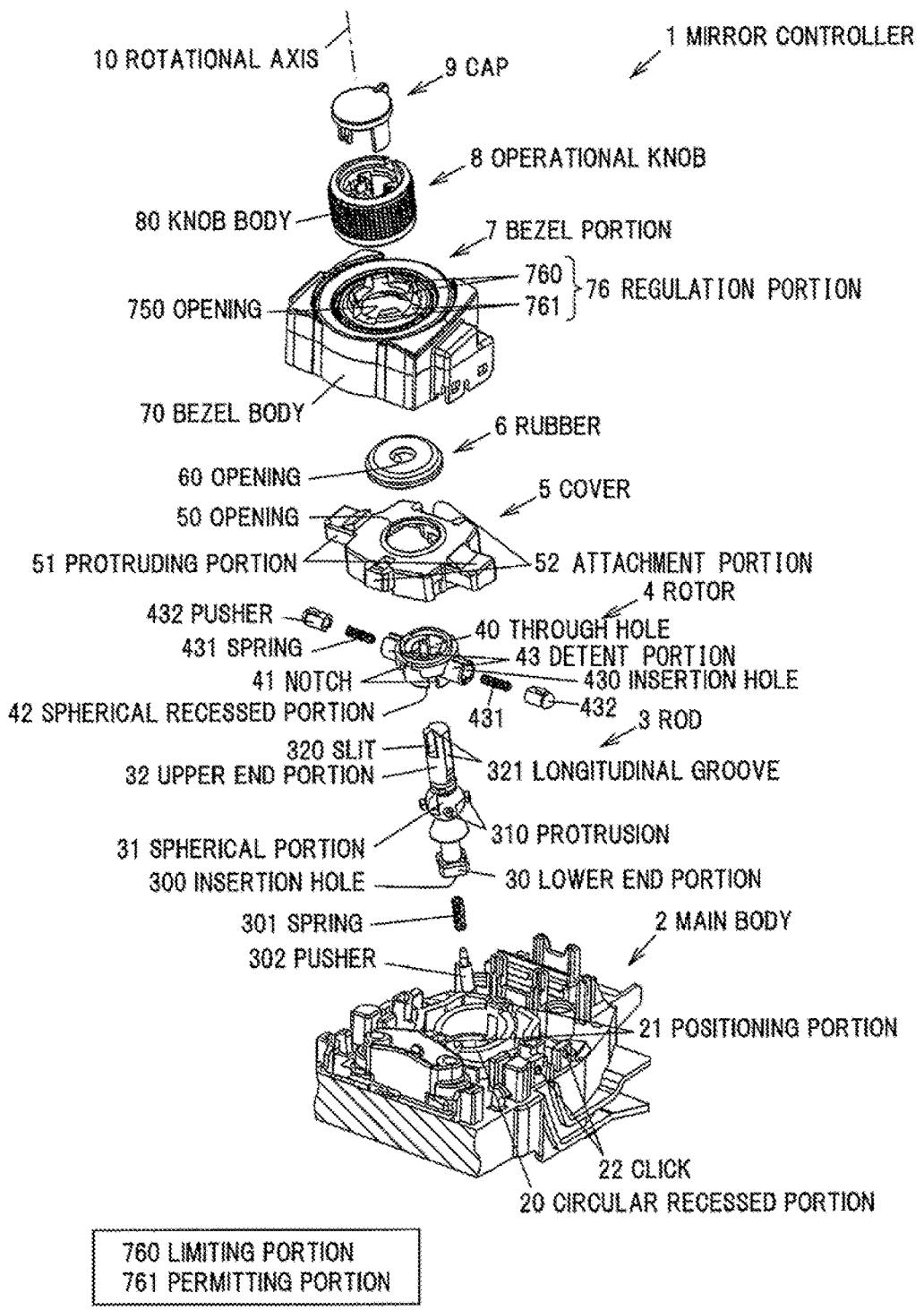
FIG. 1 is an exploded diagram showing an example of a mirror controller according to the embodiment.
Figure 2A:
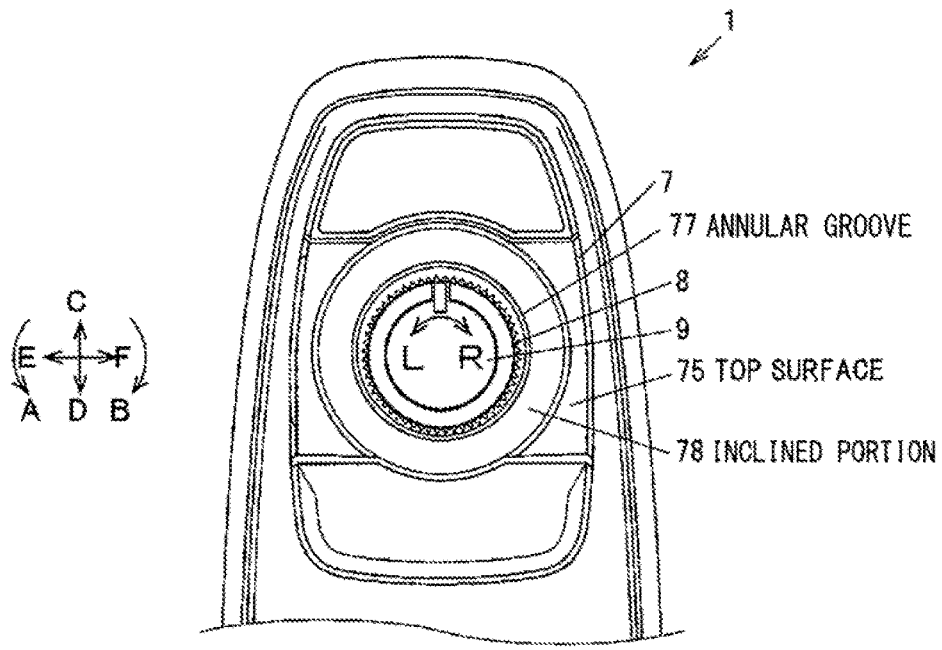
FIG. 2A is a top view showing the example of the mirror controller according to the embodiment.
Figure 2B:
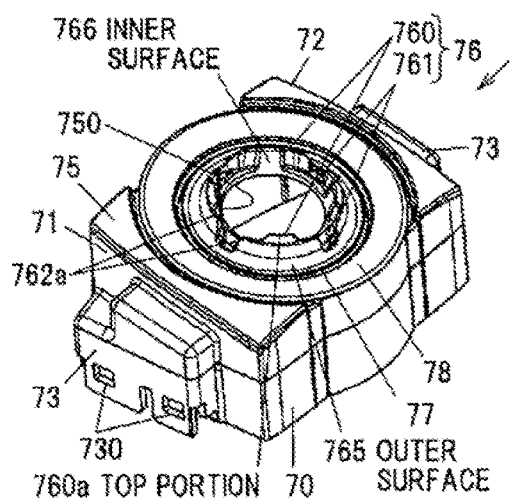
FIG. 2B is a perspective view showing an example of a bezel portion of the mirror controller.
Figure 2C:
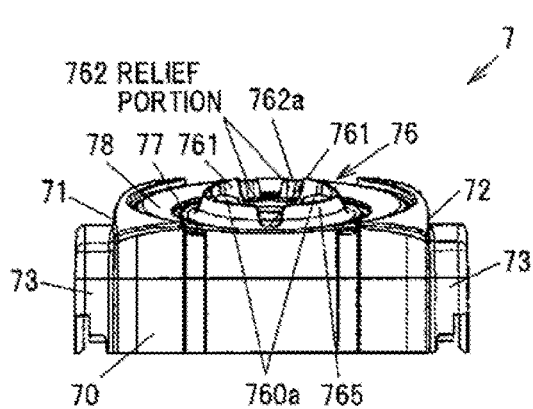
FIG. 2C is a front view showing the example of the bezel portion.
Figure 3A:
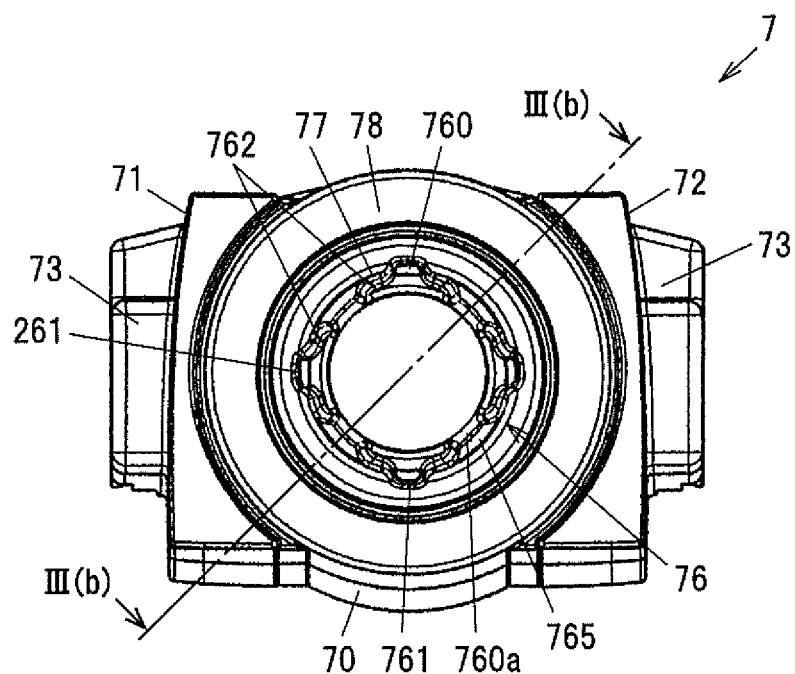
FIG. 3A is a top view showing the example of the bezel portion of the mirror controller according to the embodiment.
Figure 3B:
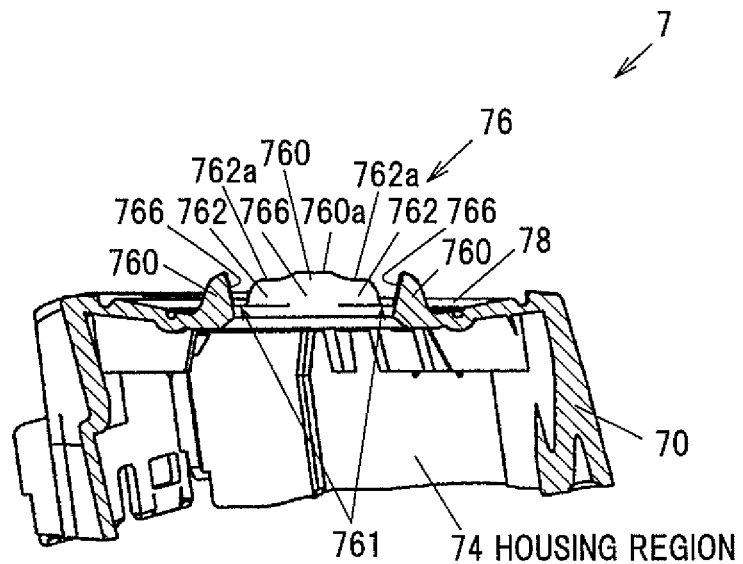
FIG. 3B is a cross sectional view cut along a line III(b)-III(b) in FIG. 3A and viewed from the arrow direction.

FIG. 1 is an exploded diagram showing an example of a mirror controller according to the embodiment. FIG. 2A is a top view showing the example of the mirror controller according to the embodiment. FIG. 2B is a perspective view showing an example of a bezel portion of the mirror controller. FIG. 2C is a front view showing the example of the bezel portion. FIG. 3A is a top view showing the example of the bezel portion of the mirror controller according to the embodiment. FIG. 3B is a cross sectional view cut along the line III(b)-III(b) in FIG. 3A and viewed from the arrow direction. Meanwhile, a ratio between the figures may be different from an actual ratio in each figure according to the embodiment that will be described below.

A mirror controller 1 as a multidirectional operating device controls angles of outer mirrors at right and left sides of vehicle. For example, this mirror controller 1 is disposed on an armrest arranged at a side surface of a vehicle door. As shown in FIGS. 1 and 2A, the mirror controller 1 is configured to control a left side outer mirror by rotating the operational knob 8 counterclockwise at 45° from the neutral position and control a right side outer mirror by rotating the operational knob 8 clockwise at 45° from the neutral position.

Specifically, as shown in FIG. 2A, the operational knob 8 can be operated to the arrow A and B directions by the rotation operation, and can be operated to the arrow C to F directions by the inclination operation. Rotation operation positions of the arrow A and B directions mean operational positions to choose the outer mirrors. The arrow A direction means the operational position to control the left side outer mirror. The arrow B direction means the operational position to control the right side outer mirror. Inclination operation positions in the arrow C and D directions mean the operational positions to rotate the chosen outer mirror in the vertical direction. Inclination operation positions in the arrow E and F directions mean the operational positions to rotate the chosen outer mirror in the horizontal direction. The neutral position means the position where the rotation operation and the inclination operation are not carried out.

As shown in FIG. 1, the mirror controller 1 is schematically configured by a main body 2, a rod 3, a rotor 4, a cover 5, rubber 6, a bezel portion 7, an operational knob 8, and a cap 9.

(Configuration of the Main Body 2)

The main body 2 is formed of a resin material. The main body 2 is configured such that a button to open and close windowpanes on front and back sides and both sides of a vehicle is arranged at the left side of the drawing sheet of FIG. 1. The mirror controller 1 is arranged at the right side of the drawing sheet of FIG. 1.

A print wiring assembly is disposed on the main body 2. A lower end portion 30 of the rod 3 is inserted from an opening of the print wiring assembly and into a circular recessed portion 20 of the main body 2. A mortar shape recessed portion is formed at a bottom surface of the circular recessed portion 20. A pusher 302 inserted into an insertion hole 300 at the lower end portion 30 of the rod 3 with a spring 301 contacts the recessed portion and causes click in the inclination operation of the operational knob 8.

(Configuration of the Rod 3)

The rod 3 is formed of a resin material. The rod 3 is schematically configured by the lower end portion 30, a spherical portion 31, and an upper end portion 32.

As described above, the insertion hole 300 is defined at the lower end portion 30. The spring 301 that is a coil spring comprising metallic material and the pusher 302 comprising the resin material are inserted into the insertion hole 300. The pusher 302 is a column whose tip end is a hemispherical shape. The lower end portion 30 has a square shape. The lower end portion 30 is mounted on a movable contact point. The movable contact point is configured to contact a stationary contact point at a backside of the print wiring assembly described above. The mirror controller 1 outputs different signals corresponding to the operational positions by the rotation operation and the inclination operation of the operational knob 8 depending on combinations between the stationary contact point and the movable contact point. Right and left side outer mirrors change the angles of the mirrors by driving a motor corresponding to the signals.

The spherical portion 31 has four protrusions 310 protruding in a radial direction by intervals of 90°. The four protrusions 310 have columnar shapes. Two protrusions whose diameters are large are opposite each other via the spherical portion 31. And two protrusions whose diameters are small are opposite each other via the spherical portion 31. These four protrusions 310 are inserted into four notches 41 of the rotor 4. Thus, the rod 3 and the rotor 4 are integrally rotated.

The upper end portion 32 has a columnar shape. The upper end portion 32 is inserted into the operational knob 8. The operational knob 8 and the rod 3 are integrated. A slit 320 and one pair of longitudinal grooves 321 that are opposite each other are arranged at the upper end portion 32.

(Configuration of the Rotor 4)

The rotor 4 is formed of a resin material. A main part of the rotor 4 has a cylindrical shape. A bottom of a cylindrical through hole 40 is formed as a spherical recessed portion 42 to insert a top of the spherical portion 31 of the rod 3. The upper end portion 32 of the rod 3 protrudes from the though hole 40.

One pair of detent portions 43 protrude from a side surface of the rotor 4 in the radial direction. An insertion hole 430 is defined at the detent portion 43. And the coil spring comprising the metallic material and the pusher 432 comprising the resin material are inserted into the insertion hole 430. The pusher 432 is engaged with a recessed portion formed at a backside of the cover 5 and clicks in the rotation operation of the operational knob 8.

(Configuration of the Cover 5)

The cover 5 is formed of a resin material. The cover 5 has one pair of protruding portions 51 and one pair of attachment portions 52 protruding from a main body of the cover 5. A housing region 74 of the bezel portion 7 houses the protruding portion 51 and the attachment portion 52.

The attachment portion 52 is engaged with one pair of positioning portions 21 of the main body 2. The cover 5 is mounted and positioned in the main body 2. Thus, the cover 5 is mounted on the main body 2 with sandwiched between the rod 3 and the rotor 4. The cover 5 defines an opening 50. The upper end portion 32 of the rod 3 protrudes from the opening 50.

(Configuration of the Rubber 6)

The rubber 6 is synthetic rubber and has a circular disk shape. The rubber 6 defines an opening 60 at the center of the rubber 6. The top end portion 3 of the rod 3 protrudes from the opening 60. The rubber 6 is disposed on a top of the cover 5. The rubber 6 prevents from entering water, dust and so on.

(Configuration of the Bezel Portion 7)

The bezel portion 7 is formed of a resin material such as acrylonitrile butadiene styrene (ABS). As shown in FIGS. 1 to 3B, one pair of protruding portions 73 are arranged so as to protrude from side surfaces 71, 72 of a bezel body 70. As shown in FIG. 2B, one pair of the protruding portions 73 respectively has two attaching openings 730. The bezel portion 7 is mounted on the main body 2 by engaging a click 22 of the main body 2 into the attaching opening 730 of the protruding portion 73.

As shown in FIG. 3B, a housing region 74 housing the cover 5 is defined in the bezel portion 7. An opening 750 is defined at the center of a top surface 75 of the bezel body 70. An outline of the opening 750 is a circular shape. A regulation portion 76 to decide an operating direction of the operational knob 8 is arranged so as to surround an outer edge of the opening 750.

In the regulation portion 76, as shown in FIGS. 2B to 3B, an outer surface 765 is rounded and inclined to a rotational axis 10 direction as it comes to an upper side. The outline of the outer surface 765 is with respect to a locus of a bottom surface 86 in the inclination operation of the operational knob 8.

The regulation portion 76 has plural limiting portions 760 and plural permitting portions 761. In the present embodiment, the limiting portions 760 and the permitting portions 761 are alternately arranged by intervals of 90°.

Specifically, the limiting portion 760 is arranged to stand up from a top surface 75 side. The limiting portion 760 is configured to be opposite to contact surfaces 842 of each rib and limits the inclination operation of the operational knob 8 while the operational knob 8 is located in the neutral position. The permitting portion 761 is arranged between the limiting portions 760. The permitting portion 761 is configured to permit the inclination operation of the operational knob 8 by preventing from contacting the contact surface 842 of each rib in the inclination operation of the operational knob 8 while the operational knob 8 is located at an operational position where the operational knob 8 can operate the inclination operation by rotationally operating to right or left from the neutral position.

The regulation portion 76 has a relief portion 762 as a recessed portion to prevent both sides of a rib that is opposite to the permitting portion 761 in the operational position where the inclination operation can be carried out from contacting the limiting portion 760 is arranged at a border between the limiting portion 760 and the permitting portion 761.

An outer surface 765 side of the relief portion 762 is smoothly formed without caving from the limiting portion 760. Meanwhile, an inner surface 766 side of the relief portion 762 caves from the regulation portion 76. Thus, the relief portion 762 has a thickness thinner than the limiting portion 760.

A top portion 762a of the relief portion 762 is formed lower than a top portion 760a of the limiting portion 760. Forming the top portion 762a lower than the top portion 760a is so as to prevent from contacting the rib of the operational knob 8 with the relief portion 762, to increase a contact area between a rib and the limiting portion 760 that will be described below, and to decrease a distance between the operational knob 8 and the top surface 75 of the bezel portion 7. As a result, the operational knob 8 closes to the bezel body 70. And the regulation portion 76 is hidden from view by the operational knob 8, viewed from an operator side.

An annular groove 77 is formed around the regulation portion 76. An inclined portion 78 that inclines downward to the regulation portion 76 is arranged around the annular groove 77. The inclined portion 78 is formed so as not to prevent the operation from being carried out by handling the operational knob 8.

In the bezel portion 7, the regulation portion 76, the annular groove 77, and the inclined portion 78 are concentrically formed around the rotational axis 10 of the operational knob 8 as the center. Thus, the bezel portion 7 has a shape in which box shaped protruding portions 73 is arranged at opposite side surfaces on which a cylinder whose top surface includes the regulation portion 76 is the center. And the bezel body 70 of the bezel portion 7 inclines downward from the right side to the left side of the main body 2 in the drawing sheet of FIG. 1. This inclement is easy for the operator to operate the operational knob 8.

(Configuration of the Operational Knob 8)

Figure 4A:
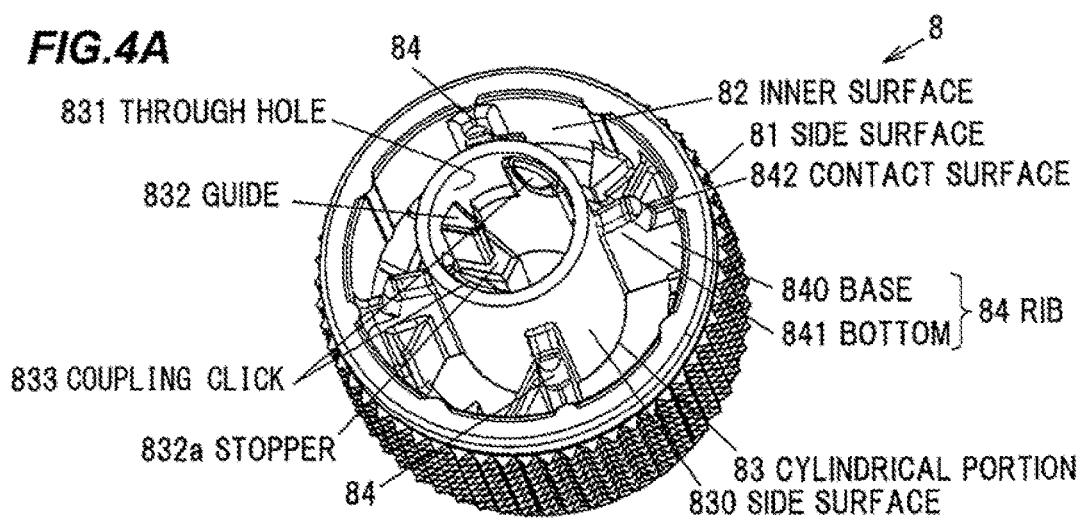
FIG. 4A is a perspective view showing an example of an operational knob of the mirror controller according to the embodiment.
Figure 4B:
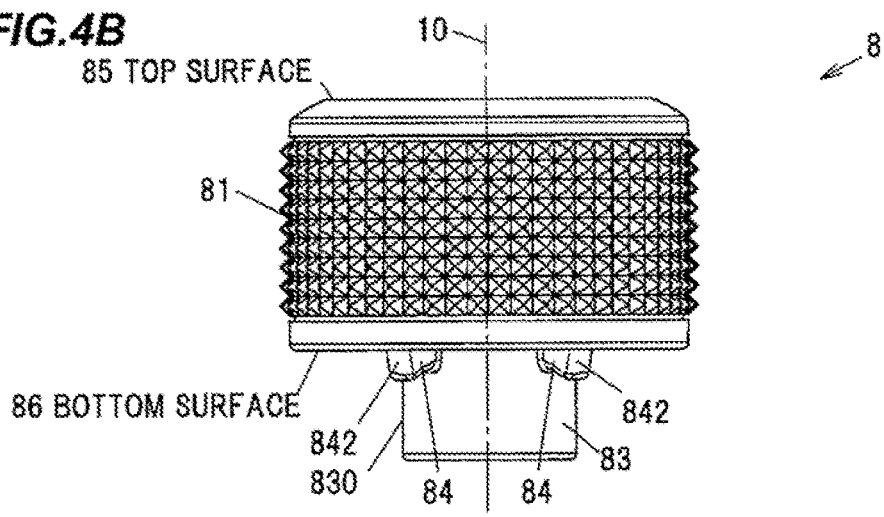
FIG. 4B is a side view showing the example of the operational knob.
Figure 4C:
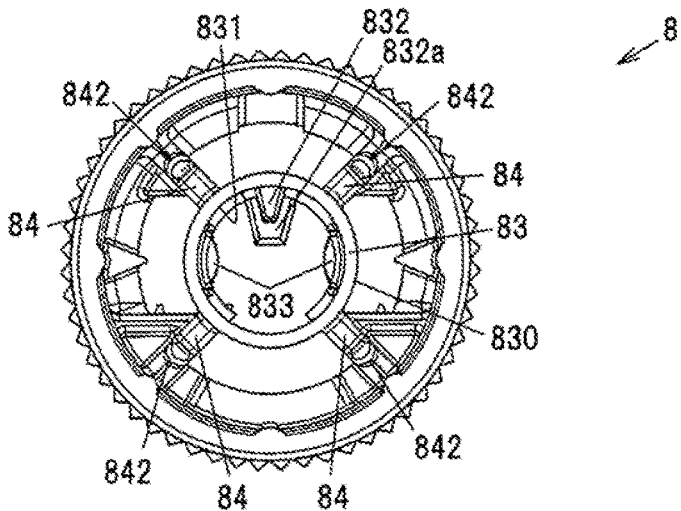
FIG. 4C is a bottom view showing the example of the operational knob.
Figure 5A:
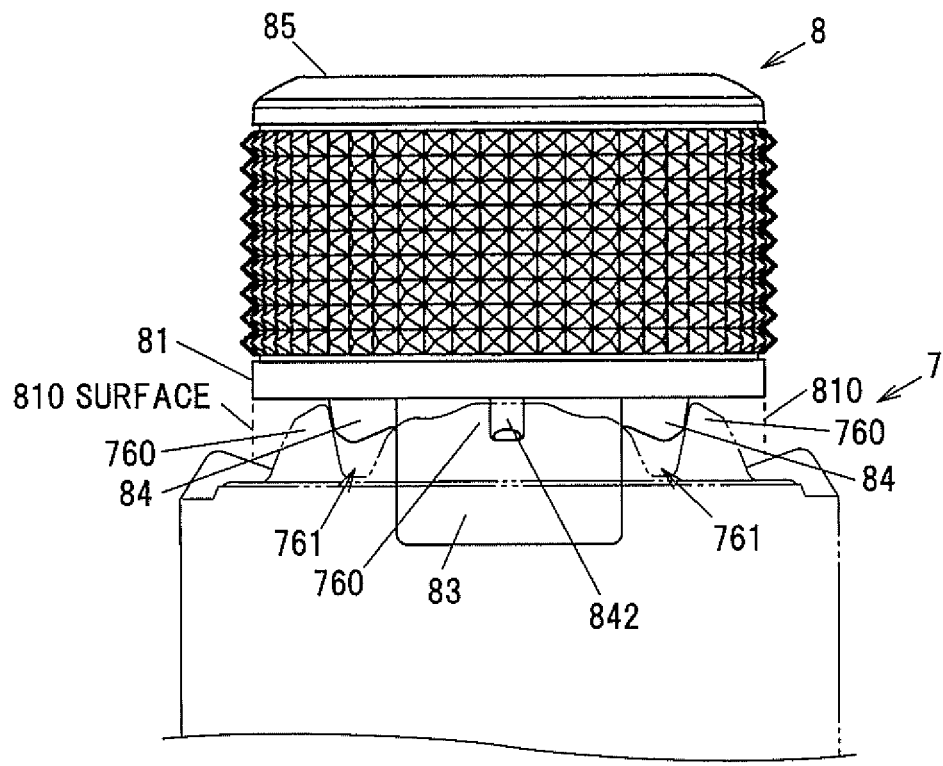
FIG. 5A is a schematic side view showing an example of positional relations between a bezel portion and the operational knob of the mirror controller according to the embodiment in a neutral position.
Figure 5B:
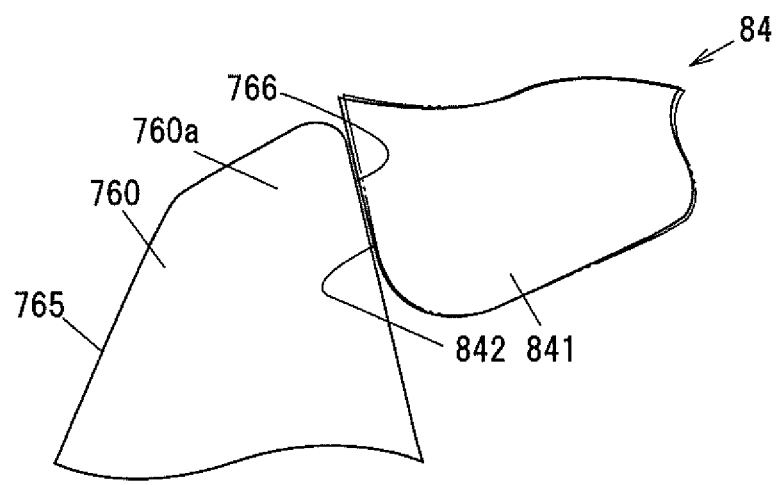
FIG. 5B is an enlarged illustration diagram showing an example of circumference of a rib and a limiting portion in inclining the operational knob at a slight angle from the neutral position.

FIG. 4A is a perspective view showing an example of an operational knob of the mirror controller according to the embodiment. FIG. 4B is a side view showing the example of the operational knob. FIG. 4C is a bottom view showing the example of the operational knob. FIG. 5A is a schematic side view showing an example of positional relations between a bezel portion and the operational knob of the mirror controller according to the embodiment in a neutral position. FIG. 5B is an enlarged illustration diagram showing an example of circumference of a rib and a limiting portion in inclining the operational knob at a slight angle from the neutral position.

The operational knob 8 is formed of a resin material such as ABS. As shown in FIGS. 4A to 4C, a knob body 80 of the operational knob 8 has a cylindrical shape. The side surface 81 is wrinkled.

The operational knob 8 has a cylindrical portion 83 having the cylindrical shape. In the operational knob 8, the cylindrical portion 83 and the knob body 80 are concentrically formed at the rotational axis 10 as the center.

The operational knob 8 has four ribs 84. These four ribs 84 are formed so as to connect an inner surface 82 of the knob body 80 and a side surface 830 of the cylindrical portion 83. The rib 84 has a plane shape. The rib 84 has the base 840 and the bottom 841.

The base 840 is a connecting portion between the knob body 80 and the cylindrical portion 83. The bottom 841 is a protruding portion from the lower side of the base 840. One side of the bottom 841 is connected to the cylindrical portion 83. As shown in FIGS. 5A and 5B, an outer surface of the bottom 841 is a contact surface 842. A lower side of the bottom 841 has a shape whose lower side rises from outside to inside.

As shown in FIG. 5A, the contact surface 842 is located between a surface 810 that extends from the side surface 81 of the knob body 80 of the operational knob 8 and the side surface 830 of the cylindrical portion 83. The limiting portion 760 and the permitting portion 761 are located inside the extended surface 810 in the neutral position and the operational position where the inclination operation can be carried out. And the limiting portion 760 and the permitting portion 761 are opposite to the contact surface 842 of the rib 84.

The contact surface 842 of the rib 84 and an inner surface 766 of the limiting portion 760 that is opposite to the contact surface 842 of the rib 84 in the neutral position are inclined each other so as to surface contact to each other and limit the inclination operation in inclining the operational knob 8. FIG. 5A shows the surface contact between the inner surface 766 and the contact surface 842 by slightly inclining the operational knob 8. Two-dot line shown in FIG. 2B shows the rib 84 before inclined. And the solid line shows the rib 84 after inclined.

As shown in FIG. 5B, shapes of the contact surface 842 of the rib 84 and the inner surface 766 of the limiting portion 760 are defined so as to substantially surface contact in contacting the rib 84 with the limiting portion 760. As an example, the operational knob 8 is configured to contact the contact surface 842 with the inner surface 766 in the inclination from the neutral position at 0.96° in the arrow C to F directions and the inclination from the neutral position at 0.69° in an intermediate inclining direction such as an intermediate direction between the arrow C and F directions.

The upper end portion 32 of the rod 3 is inserted into a through hole 831 of the cylindrical portion 83. A guide 832 having a triangle pole shape and protruding from the inner surface to the rotational axis 10 is formed in the through hole 831. The guide 832 guides the insertion of the rod 3 and is inserted into the slit 320 of the upper end portion 32 of the rod 3. The stopper 832a is arranged on the guide 832. The rod 3 is inserted until the rod 3 contacts the stopper 832a.

One pair of coupling clicks 833 that have half circular disk shapes, and are opposite to and protrude from the inner surface are formed in the though hole 831. The coupling click 833 is a stopper to be engaged with the longitudinal groove 321 at the upper end portion 32 of the rod 3. The operational knob 8 is integrated with the rod 3 by engaging the coupling click 833 into the longitudinal groove 321 by inserting the upper end portion 32 of the rod 3 into the through hole 831.

The cap 9 is attached to a top surface 85 of the knob body 80. Stamps such as the neutral position and words indicating the operating direction are printed on the cap 9.

An example of an operation of the mirror controller 1 in the present embodiment will be explained below.

(Operation)

Figure 7A:
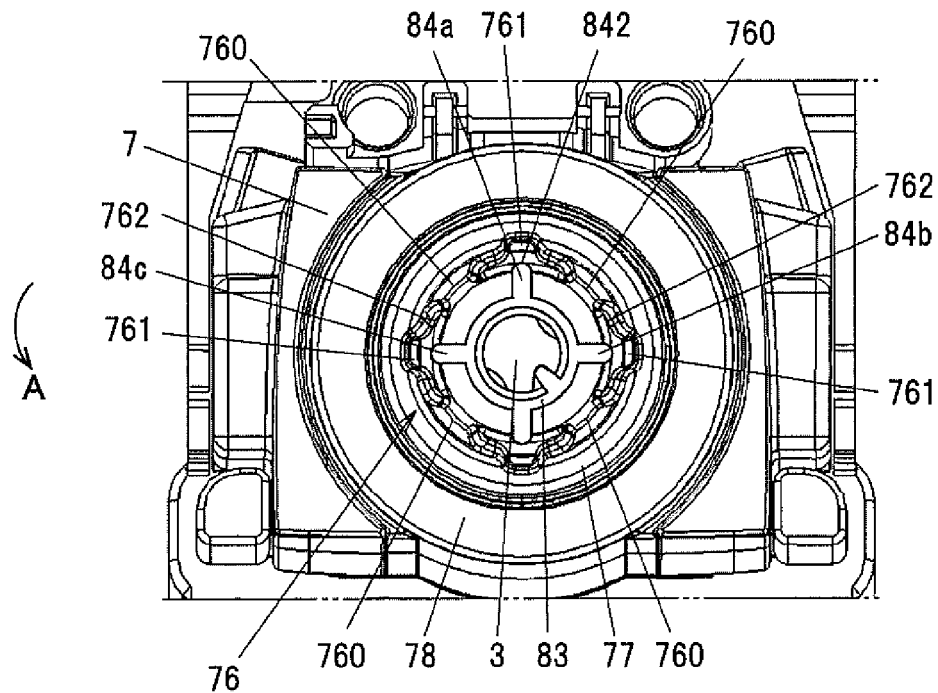
FIG. 7A is a cross sectional view cut along a line VI(b)-VI(b) in FIG. 6A and viewed from the arrow direction when the inclination operation of the mirror controller according to the embodiment is allowed.
Figure 7B:
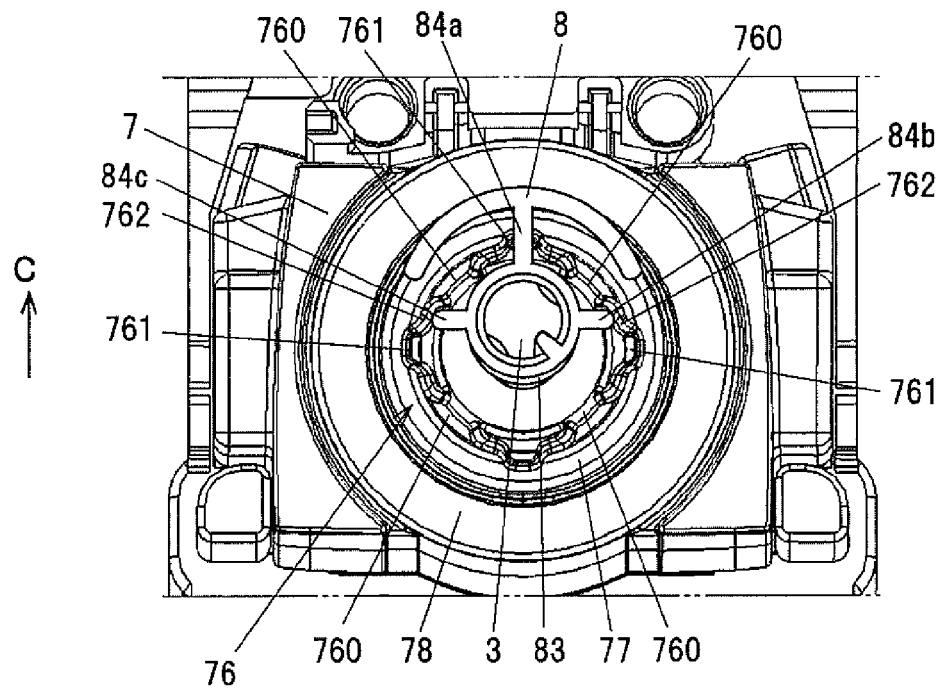
FIG. 7B is a cross sectional view cut along a line VI(b)-VI(b) in FIG. 6A and viewed from the arrow direction when the operational knob is operated to the arrow C direction.

FIG. 6A is a side view showing an example of the mirror controller according to the embodiment. FIG. 6B is a cross sectional view showing the operational knob 8 in the neutral position cut along the line VI(b)-VI(b) in FIG. 6A, viewed from the arrow direction. FIG. 7A is a cross sectional view cut along the line VI(b)-VI(b) in FIG. 6A and viewed from the arrow direction when the inclination operation of the mirror controller according to the embodiment is allowed. FIG. 7B is a cross sectional view cut along the line VI(b)-VI(b) in FIG. 6A and viewed from the arrow direction when the operational knob is operated to the arrow C direction. Meanwhile, FIG. 6A shows an example in a state that the operational knob 8 is inclined to the arrow C direction.

As shown in FIG. 6B, the four ribs 84 of the operational knob 8 are opposite to the limiting portions 760 of the regulation portions 76 while the operational knob 8 is located in the neutral position. In this case, the operator can incline the operational knob 8 with only substantially fail to feel since the contact surface 84 of the rib 84 contacts the inner surface 766 of the limiting portion 760 of the operational knob 8.

Next, when the operational knob 8 is rotated by 45° to the arrow A direction, as shown in FIG. 7A, the four ribs 84 are opposite to the permitting portions 761. That is, the operational knob 8 is operated such that the lift side outer mirror can be controlled. In this case, the movable contact point mounted on the edge of the rod 3 rotates and contacts the stationary contact point to select the left side outer mirror.

As shown in FIG. 7A, the inclination operation of the operational knob 8 can be carried out since the rib 84 of the operational knob 8 is opposite to the permitting portion 761, that is, the recessed portion. As shown in FIG. 7B, the rib 84 moves so as to be engaged with the permitting portion 761 when the operational knob 8 is inclined to the arrow C direction.

In this case, as shown in FIG. 7B, as the rib in the arrow C direction is defined as the rib 84a, and both side ribs of the rib 84a are defined as the rib 84b and the rib 84c, the rib 84b and the rib 84c respectively move to the relief portions 762 of the limiting portions 760. The relief portions 762 fails to contact the rib 84b and the rib 84c since the relief portions 762 cave deeper than the limiting portion 760.

The movable contact point contacts the stationary contact point to output signal to rotate the mirror upward by the operation in the arrow C direction. The mirror controller 1 outputs the signal to rotate the left side outer mirror upward to a drive part for the left side outer mirror by the operation.

Meanwhile, as shown in FIG. 7B, the bottom surface 86 of the operational knob 8 comes near to contacting with the inclined portion 78 of the bezel portion 7 in the inclination operation of the operational knob 8, the operational knob 8 avoid contacting since the inclined portion 78 inclines downward to the rotational axis 10.

(Effects of the Embodiment)

The mirror controller 1 according to the present embodiment can prevent the operational knob 8 from causing the backlash in the neutral position. Specifically, the mirror controller 1 limits the inclination operation by the contact surfaces 842 of the four ribs 84 of the operational knob 8 being opposite to the four limiting portions 760 of the regulation portion 76 of the bezel portion 7. The mirror controller 1 can limit steeply inclining and causing the backlash comparing with a structure that fails to apply the above structure since the mirror controller 1 limits the inclination operation by the contact surface 842 and the limiting portion 760 being close to the bottom surface 86 of the operational knob 8, that is to say, by contacting nearby a bottom end of the operational knob 8.

The mirror controller 1 can stately prevent from causing the backlash in the neutral position without depending on an inclining direction of the operational knob 8 since the rib 84 and the limiting portion 760 are formed by intervals of 90°.

The mirror controller 1 can prevent from causing the backlash more stately caused by even contact since the mirror controller 1 is configured to be formed so as to surface contact in contacting the contact surface 842 with the inner surface as the contact surface of the limiting portion 760.

The mirror controller 1 looks good and has good design since the mirror controller 1 fails to apply the structure configured to permit the inclination operation by making cut in the bottom side of the operational knob 8 so as to prevent from causing the backlash in the neutral position.

In the mirror controller 1, the regulation portion 76 is hard to be seen from the operator since the regulation portion 76 and the contact surface 842 of the rib 84 are located between the surface 810 that extends from the side surface 81 of the operational knob 8 and the side surface 830 of the cylindrical portion 83. Moreover, manufacturing costs of the mirror controller 1 can be reduced since a part such as a boot to cover the bottom side of the operational knob 8 can be omitted since the distance between the operational knob 8 and the bezel portion 7 is short and a part such as the regulation portion 76 are hard to be seen from the operator.

In the mirror controller 1, since the relief portion 762 is formed between the limiting portion 760 and the permitting portion 761, although the inclination operation is in full stroke, the rib 84 fails to contact the limiting portion 760 while the distance between the operational knob 8 and the bezel portion 7 is short. An angle in the inclination operation can increase.

The mirror controller 1 has no friction in the rotation operation caused by contacting and can provide good operational feeling since the contact surface 842 of the rib 84 fails to contact the inner surface 766 of the limiting portion 760 in the neutral position.

Although the embodiment has been described, the embodiment is just only one example, and is not intended to limit the claimed invention. Further, the novel embodiment can embodied in a variety of other embodiment, the various kinds of modifications, omissions, substitutions, and changes can be implemented without departing from the gist of the invention. It should be noted that all combinations of the features described in the embodiments are not necessary to solve the problem of the invention. The accompanying claims and their equivalents are intended to cover such forms of modifications as would fall within the scope and the gist of the inventions.

The invention claimed is:

1. A multidirectional operating device, comprising:
an operational knob comprising a knob body that is adapted to a rotation operation and an inclination operation, a cylindrical portion that protrudes from a bottom side of the knob body, and a plurality of ribs that protrude from a side surface of the cylindrical portion in a radial direction; and
a bezel portion disposed around a rotational axis of the operational knob,
wherein the bezel portion comprises:
a plurality of limiting portions formed standing from a top surface side so as to limit the inclination operation of the operational knob by being opposite to a contact surface of the ribs when the operational knob is located at a neutral position; and
a plurality of permitting portions arranged between the plurality of limiting portions so as to permit the inclination operation of the operational knob while avoiding a contact with the contact surface of the ribs when the operational knob is located at an operational position that allows the inclination operation by being rotated from the neutral position to a right or left position.

2. The multidirectional operating device according to claim 1, wherein the contact surface is located between a surface that extends from a side surface of the knob body of the operational knob and the side surface of the cylindrical portion, and
wherein the plurality of limiting portions and the plurality of the permitting portions are located inside the extended surface and opposite to the contact surface of the ribs at the neutral position and an operation position where the inclination operation is allowed.

3. The multidirectional operating device according to claim 1, wherein the bezel portion further comprises a recessed portion at a border between the limiting portions and the permitting portions, and
wherein the recessed portion prevents both adjacent ribs to one rib that is opposite to the permitting portion from contacting the limiting portions at an operation position where the inclination operation is allowed.

4. The multidirectional operating device according to claim 1, wherein the contact surface of the rib and an inner surface of the limiting portions that is opposite to the contact surface of the ribs at the neutral position are inclined each other so as to surface contact and prevent the inclination operation when the operational knob is inclined.

5. The multidirectional operating device according to claim 1, wherein at the neutral position, the limiting portions whose number is the same as the ribs are opposite to the ribs.

6. The multidirectional operating device according to claim 1, wherein the limiting portions comprise a contact surface to surface contact with the contact surface of the ribs at the time of the inclination operation.

7. The multidirectional operating device according to claim 1, wherein a contact surface of the limiting portions that contacts with the contact surface of the ribs at the neutral position is located lower than a bottom end of a side surface of the knob body.

\* \* \* \* \*